United States Patent [19]

Bowden, III et al.

[11] Patent Number: 5,291,580
[45] Date of Patent: Mar. 1, 1994

[54] HIGH PERFORMANCE BURST READ DATA TRANSFER OPERATION

[75] Inventors: Raymond D. Bowden, III, Tewksbury; Richard A. Lemay, Carlisle; Chester M. Nibby, Jr., Beverly; Jeffrey S. Somers, Lowell, all of Mass.

[73] Assignee: Bull HN Information Systems Inc., Billerica, Mass.

[21] Appl. No.: 771,703

[22] Filed: Oct. 4, 1991

[51] Int. Cl.⁵ .............................................. G06F 13/28
[52] U.S. Cl. ...................................... 395/425; 395/400
[58] Field of Search ................................ 395/400, 425

[56] References Cited

U.S. PATENT DOCUMENTS

| | | | |
|---|---|---|---|
| 4,366,539 | 12/1982 | Johnson et al. | 364/200 |
| 4,370,712 | 1/1983 | Johnson et al. | 364/200 |
| 5,134,699 | 7/1992 | Aria et al. | 395/425 |

OTHER PUBLICATIONS

Goodman et al, "The Use of Static Column RAM as a Memory Hierarchy", SIGARCH Newsletter, vol. 12, Issue 3, Jun. 1984; The 11th Annual International Symposium on Computer Architecture.

"The 80486: A Hardware Perspective" by Ron Sartore, Byte Magazine, Fall 1989, pp. 67-70, 72-74.

Primary Examiner—David L. Robertson
Attorney, Agent, or Firm—Faith F. Driscoll; John S. Solakian

[57] ABSTRACT

A memory system tightly couples to a high performance microprocessor through a synchronous bus. The logic circuits included in the memory system generate a blipper pulse signal using successive transitions of clock pulse signals other than the edges used to synchronize microprocessor and memory operations. The blipper pulse signal is logically combined with the memory's column address strobe timing signal which is derived from the synchronizing edges of clock pulse signals which defines the duration of the column address interval required for accessing of a pair of DRAM memories during successive memory cycles for providing sequences of four memory read responses with no wait state.

12 Claims, 3 Drawing Sheets

HIGH PERFORMANCE BURST READ DATA TRANSFER OPERATION

RELATED APPLICATION

The patent application of Raymond D. Bowden, III and Chester M. Nibby, Jr. entitled, "Burst Read Address Generation," filed on Oct. 4, 1991, bearing Ser. No. 07/77/702, which is assigned to the same assignee as this patent application.

BACKGROUND OF THE INVENTION

1. Field of Use

This invention relates to memory systems and more particularly to transfers of multiple words of data by a memory system to a requesting unit (i.e., burst mode).

2. Prior Art

It is well known to construct memory systems from a number of modules. In certain systems, memory modules are paired together to provide a double word fetch access capability (i.e., access a pair of words at a time during a memory cycle of operation).

Such systems are designed to include a burst mode transfer capability wherein a memory controller, which connects in common to a system bus, can deliver groups of multiple words accessed simultaneously over a series of bus cycles without incurring communication delays. U.S. Pat. Nos. 4,366,539 and 4,370,712 describe this type of system.

This capability has been incorporated into high performance microprocessors, such as the Intel 80486 microprocessor. Such burst mode operations are carried out on the microprocessor's synchronous local bus according to a predetermined bus protocol and requires only a single clock cycle per word transfer. To take advantage of this high speed burst mode, it has been proposed to have the microprocessor's main memory structured to be 64 bits wide. In this case, the initial access to memory would require wait state while the subsequent accesses are already present. The third and fourth accesses of the burst each then utilize the clocked page mode mechanism to achieve zero wait states. This proposal is discussed in an article entitled, "The 80486: A Hardware Perspective", by Ron Santore, Byte Magazine, Fall 1989.

While in theory this seems possible, it has been found that at higher speeds, such as 33 MHz, when the memory normally is clocked on the same edges of the system clock signal as the microprocessor, it still requires at least one wait state to occur between successive double word fetches, in order to generate the minimum precharge times required for reliable memory operation. This is due to the necessity to regenerate successive synchronously generated column address strobe (CAS) timing signals for meeting this requirement. Hence, an additional clock time is required. Also, the arrangement proposed in the article specifies the use of very high speed components, such as 60 nanosecond memory chip parts which were not commercially available at the time and today are not commercially available in large quantities.

Accordingly, it is a primary object of the present invention to enable the execution of a burst read operation by a memory unit at a rate which does not reduce system performance.

SUMMARY OF THE INVENTION

The above objects are achieved in a preferred embodiment of a memory system of the present invention which tightly couples to a high performance microprocessor through a synchronous bus. The operations of both the memory system and microprocessor are synchronized by clock pulses generated on a common single frequency clock generator. The memory system includes logic circuits for generating a blipper pulse signal derived from predetermined edges of two successive clock pulse signals other than the edges used to synchronize microprocessor and memory operations. The blipper pulse signal is logically combined with the memory's column address strobe timing signal which is derived from the synchronizing edges of clock pulse signals defining the duration of the column address interval of a memory cycle. This results in the generation of the required sequence of column address signals. The column address strobe signals enable accessing of a pair of DRAM memories during successive memory cycles to read out successive pairs of words. The DRAM memories are organized to have a width which is no more than twice the width of the data bus portion of the synchronous bus. The arrangement provides for a sequence of four memory read responses with no wait state.

The above objects and advantages of the present invention will be better understood from the following description when taken in connection with the accompanying drawings.

DETAILED DESCRIPTION OF THE PREFERRED EMBODIMENT

Figure 1:
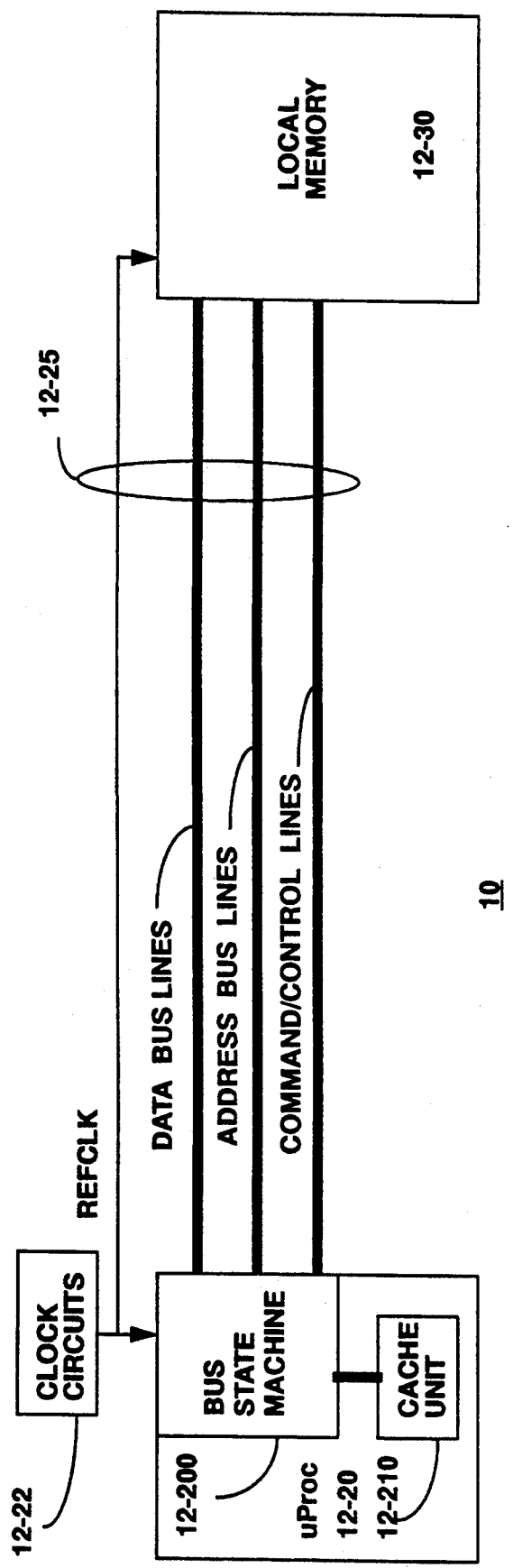
FIG. 1 is a block diagram of a system which incorporates the apparatus of the present invention.

Description of FIG. 1

Referring to FIG. 1, it is seen that the system includes a microprocessor 12-20 which tightly couples a local memory 12-30 through a local processor bus 12-25. The processor 12-20 is a high performance 32-bit processor which operates at clock speeds of up to 33 MHz and in the preferred embodiment corresponds to an Intel 80486 chip.

The Intel 80486 chip includes a microprocessor, a floating-point math coprocessor, and a memory cache controller and an 8K RAM cache unit, collectively labeled as block 12-210 in FIG. 1. The principal processing function is performed by the microprocessor while complex processing functions, such as floating operations, are performed by the math coprocessor. The internal cache unit 12-210 provides fast access to the data required for processing.

The system further includes the clock generation circuits of block 12-22 which generate a single frequency clock signal REFCLK of 33 MHz which provides the fundamental timing and internal operating frequency for microprocessor 12-20, in addition to all of the other circuits which make up system 10.

In greater detail, the microprocessor 12-20 and local memory 12-30 are tightly coupled to the address, data and command/control bus lines of local bus 12-25, as shown. The microprocessor's bus interface couples internally to a bus state machine 12-200. State machine 12-200 is used to control the microprocessor's access to local bus 12-25 by the generation of the proper bus protocol.

Figure 2:
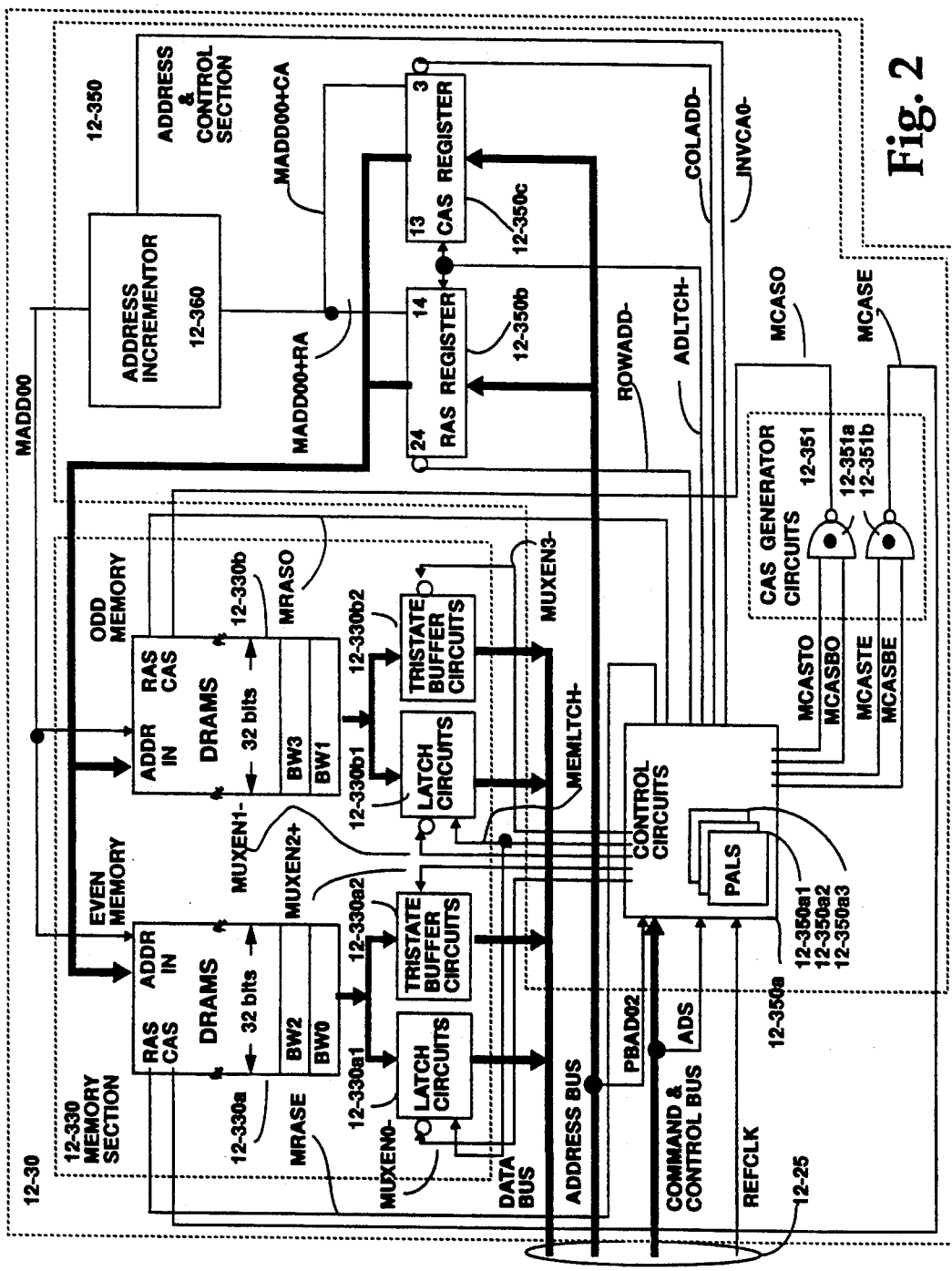
FIG. 2 is a block diagram of the local memory of FIG. 1.

Description of FIG. 2

FIG. 2 shows in greater detail, the local memory 12-30. As shown, memory 12-30 includes a memory section 12-330 and an address and control section 12-350. The memory section 12-330 includes a 64-bit wide memory which includes 32-bit wide even and odd dynamic random access memory DRAM units 12-330a and 12-330b. Each of the DRAM units 12-330a and 12-330b include 32, 4 megabit DRAM chips which provide 32-bit bus words which are read out either to the D-type transparent latch circuits of blocks 12-330a1/12-330b1 or to the tristate buffer driver circuits of blocks 12-330a2/12-330b2 for application to the 32-bit wide data bus of local bus 12-25. These circuits are enabled by different ones of the control signals MUXENO−, NUXEN2+, MUXEN1− and MUXEN3− as shown in FIG. 2.

The DRAM chips normally are 80 nanosecond arrays. These chips are designed to operate in a fast page mode as a high speed access mode wherein successive memory cycles defined by a corresponding number of CAS signals are performed during the interval defined by a single row address strobe (RAS) signal.

The address and control section 12-350 includes the programmable array logic (PAL) control circuits of block 12-350a. These include a column address strobe (CAS) blipper pulse generator circuit 12-350a1 and a pair of CAS control circuits 12-350a2 and 12-350a3. The PAL circuit 12-350a1, in accordance with the present invention, generates the required CAS blipper signals MCASBE and MCASBO. The PAL circuit 12-350a2 generates CAS timing signals MCASTE and MCASTO. These groups of signals are combined within a pair of NAND gates 12-351a and 12-351b of CAS generation circuits block 12-351 to produce output CAS signals MCASE and MCASO, as shown. The signals MCASE and MCASO are applied to the CAS input terminals of the DRAM chips of the even and odd memories 12-330a and 12-330b.

The DRAM chips take the form of CMOS dynamic RAM organized 4,194,304 word × 1 bit chips designated as HM514100, manufactured by Hitachi America, Ltd.

Additionally, address and control section 12-350 include a row address strobe register 12-350b and a column address strobe register 12-350c. These registers are loaded with the row address and column address portions (i.e., bits 24-14 and bits 13-3) of the 32-bit memory array address applied to the address bus portions of local bus 12-25, in response to a load signal ADLTCH−. During successive read cycles of operation, the address bit contents of RAS register 12-350b and CAS register 12-350c are applied in succession to the address inputs of the DRAM chips of memories 12-330a and 12-330b, in response to enable signals ROWADD− and COLADD−, generated by CAS control circuit 12-350a3. The circuits of block 12-360 provide the required incrementing of CAS addresses. The referenced related patent application describes apparatus for carrying out such incrementing operations, in addition to apparatus for generating control signals MUXENO- through MUXEN3−.

DESCRIPTION OF OPERATION

With reference to FIGS. 1 and 2, the operation of the apparatus of the present invention will now be described relative to the timing diagram of FIG. 3. The microprocessor 12-20 is capable of performing a burst transfer operation requiring four 32-bit bus word transfers during a corresponding number of cycles. For maximum performance, the four words must be transferred during four successive clock cycles. On each clock, a new word is strobed into the microprocessor 12-20 and written into cache unit 12-210, enabling the filling of a cache line corresponding to a 16-byte aligned area in local memory which begins at location XXXXXXX0 and ends at location XXXXXXXF.

Burst cycles begin with microprocessor 12-20 asserting address status signal (ADS-) at the rising or leading edge of the first clock. Microprocessor 12-20 indicates that it wants to perform a burst transfer by holding burst last signal (BLAST) inactive in the second clock of the cycle. Local memory 12-30 indicates acceptance by forcing burst ready signal (BRDY) to an active state. The fastest burst transfer requires two clocks for the first word with the subsequent words returned every clock.

With commercially available DRAM memories, cycle times of 80 nanoseconds are typical. Under normal operating conditions, this requires that a wait state be included between the second and third word responses because of the time required in generating the required number of memory column address strobe (CAS) signals used for successive memory cycles of operation in reading out the required number of words corresponding to a cache line.

The local memory 12-30 includes apparatus which enables the successive memory read operations to be performed without incurring any wait states while ensuring reliable operation. This is accomplished by the generation of a so-called blipper pulse signal(s) (MCASBE/MCASBO) which is logically combined with a memory column address strobe timing signals (MCASTE/MCASTO). This will now be described with reference to FIG. 3.

As shown, the memory cycle is initiated when microprocessor 12-20 forces the address strobe signal ADSlow. On the leading edge of the next clock signal (#2), the control circuits of block 12-350a generate the row address strobe timing signals MRASO and MRASE, which are applied as inputs to memories 12-330a and 12-330b. Prior to that, the row and column address portions of the memory address applied to the address bus lines of bus 12-25 will have been loaded into the RAS and CAS registers 12-350b and 12-350c in response to the address load signal ADLTCH-. The row address portion is applied to the DRAM memory chips address input terminals in response to tristate row address signal ROWADD−. This results in the storage of the row address portion in all of the DRAM chips of memories 12-330a and 12-330b.

Figure 3:
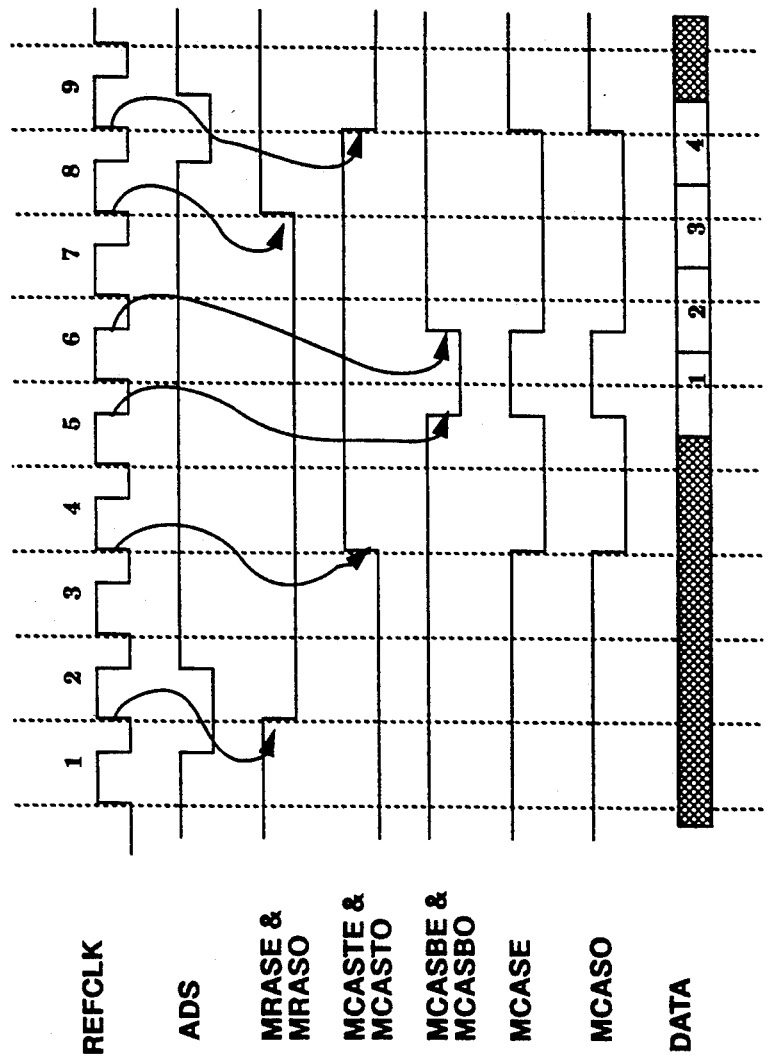
FIG. 3 is a diagram used to describe the operation of the present invention.

As seen from FIG. 3, the column address strobe timing signal CAST is forced high on the leading edge of the fourth clock signal. Signal CAST defines the time interval during which the column address portions are to be loaded into the DRAM chips. The DRAM chips enable a series of column addresses to be applied to the chips following the storage of the row address for read of successive words, during a corresponding number of cycles.

According to the present invention, the CAS blipper pulse generator PAL circuit of block 12-350a generates the blipper pulse signal(s) MCASBO and MCASBE using the trailing edges of the fifth and sixth clock pulses. This pulse(s) is then logically combined with the CAS signals MCASTE and MCASTO in NAND gates of block 12-351 to produce the resulting CAS output signals MCASO and MCASE, as shown in FIG. 3.

The CAS output signals MCASO and MCASE are applied to the CAS input terminals of the DRAM chips of memories 12-330a and 12-330b. During the first read memory cycle, the CAS control PAL circuit of block 12-350a generates column address enable signal COLADD- which applies the column address contents of CAS register 12-350c to the address inputs of the DRAM chips of memories 12-330a and 12-330b which are stored therein, in response to CAS signals MCASO and MCASE. This results in the read of the first two 32-bit (BW0 and BW1) words from memories 12-330a and 12-330b into the latch circuits 12-330a1 and 12-330b1. The words are stored or latched by signal MEMLTCH− generated by the CAS blipper generator PAL circuit of block 12-350a. This is done since the CAS signals MCASP and MCASE are removed on the negative edge of clock pulse 5 before the words BW0 and BW1 are delivered to microprocessor 12-20, in response to enable signals MUXENO− and MUXEN1− generated by the control circuits of block 12-350a.

During the time interval defined by blipper pulse MCASBE and MCASBO, the DRAM chips are turned off and allowed to precharge for a predetermined period of time thereby ensuring proper operation. During the next read cycle, the least significant column address bit which corresponds to address bit MADD00+CA is incremented by one. As mentioned, the addresses of the words being transferred during the burst transfer all fall in within the same 16 byte aligned area corresponding to an internal microprocessor cache line, and the area always begins at location XXXXXXX0 and ends at XXXXXXXF. Therefore, the column address bit is always incremented from a binary 0 to a binary 1 without any carry. Hence, it is only required that memory address bit signal MADD00 of the CAS address portion be complemented which is done in response to signal INVCA0−.

In the manner previously described, in response to the next time that CAS signals MCASO and MCASE go low, at the trailing edge of clock 6, the incremented column address applied to the address input terminals of the DRAM chips of memories 12-330a and 12-330b, in response to column address enable signal COLADD−, is stored in all of the DRAM chips. This results in the read out of the next pair of words BW2 and BW3 into the tristate buffer driver circuits 12-33Oa2 and 12-33Ob2. These words are applied in sequence to the data lines of bus 12-25, in response to enable signals MUXEN2 and MUXEN3, generated by the control circuits of block 12-350a. As seen from FIG. 3, the transfer of all four bus data words takes place without any wait state.

It will be appreciated by those skilled in the art that many changes may be made without departing from the teachings of the present invention. For example, the invention may be used in conjunction with different types of protocols and commands. Also, while the preferred embodiment utilizes different PAL circuits to perform certain functions that such functions can be combined in certain instances and performed within a single circuit. Also, the invention is not limited to any specific type of circuit.

APPENDIX

Description of equation symbols:
(Where # = OR: ! = negation; and & = AND)

BLIPPER PULSE GENERATOR PAL CIRCUIT
12-350a1

DEVICE        16R8-7

MODULE XCD08

Pin Specifications:
(Inputs)

REFCLK      PIN    1;   "REFCLK-30
DBCLR       PIN    2;   "DBCLR+00
!BLIPEN     PIN    3;   "BLIPEN-00

(Outputs)

```
!MEMLTCH  PIN    13;  "MEMLTCH-00
!MCASBO   PIN    15;  "MCASBO-01
!MCASBE   PIN    17;  "MCASBE-01
Q0        PIN    19;  "State bit.
```

"Equates.

```
STATE0 = ^b1;
STATE1 = ^b0;

FALSE = 0;
TRUE  = 1;

QSTATE = [Q0];

equations state_diagram QSTATE
State STATE0: "Idle, waiting for BLIPEN.
     "Reset.
     IF (DBCLR) THEN STATE0
     WITH   MEMLTCH := FALSE;
            MCASBO  := FALSE;
            MCASBE  := FALSE;
     ENDWITH;

IF (!DBCLR & !BLIPEN) THEN STATE0
     WITH   MEMLTCH := FALSE;
            MCASBO  := FALSE;
            MCASBE  := FALSE;
     ENDWITH;

IF (!DBCLR &  BLIPEN) THEN STATE1
     WITH   MEMLTCH := TRUE;
            MCASBO  := TRUE;
            MCASBE  := TRUE;
     ENDWITH;

State STATE1:
     GOTO STATE0
     WITH   MEMLTCH := TRUE;
            MCASBO  := FALSE;
            MCASBE  := FALSE;
     ENDWITH;
```

CAS CONTROL PAL CIRCUIT 12-350a2

DEVICE          20R8-7

MODULE XCD18

Pin Specifications:
"        (Inputs)

```
REFCLK      PIN    1;      "REFCLK+32
DBCLR       PIN    2;      "DBCLR+00
DBADS       PIN    3;      "DBADS+10
!DBWRRD     PIN    5;      "DBWRRD-10
!DBBLAST    PIN    6;      "DBBLAST-00
PBAD02      PIN    7;      "PBAD02+10
PBAD31      PIN    8;      "PBAD31-10
PBAD30      PIN    9;      "PBAD30-10
DBMMIO      PIN   10;      "DBMMIO-10

(Outputs)

MCASTO      PIN   15;      "MCASTO+02
MCASTE      PIN   16;      "MCASTE+02
!BLIPEN     PIN   17;      "BLIPEN-00

Q3,Q2,Q1,Q0 PIN 22,21,20,19;  "State bits.

"Equates.

STATE0 = ^HF;
STATE1 = ^HA;
STATE2 = ^H8;
STATE3 = ^H2;
STATE4 = ^H6;
STATE6 = ^HB;
STATE8 = ^HE;
STATEA = ^H9;
STATEB = ^H5;
STATEC = ^H7;
STATED = ^HD;

FALSE = 0;
TRUE  = 1;
MEMACC = PBAD31 & PBAD30 & DBADS & !DBMMIO;

QSTATE = [Q3,Q2,Q1,Q0];

"Actual logic equations.

equations
state_diagram QSTATE

State STATE0:  "Idle, waiting for a regular access.

"Reset.
        IF (DBCLR) THEN STATE0
                WITH    MCASTE := FALSE;
                        MCASTO := FALSE;
                        BLIPEN := FALSE;
                ENDWITH;

"No access.

IF (!MEMACC & !DBCLR) THEN STATE0
                WITH    MCASTE := FALSE;
```

```
                    MCASTO := FALSE;
                    BLIPEN := FALSE;
            ENDWITH;

"Regular access.
    IF (MEMACC & !DBCLR) THEN STATEC
            WITH    MCASTE := FALSE;
                    MCASTO := FALSE;
                    BLIPEN := FALSE;
            ENDWITH;

State STATEC: "Normal access, wait before asserting cas.

"Reset.
    IF (DBCLR) THEN STATE0
            WITH    MCASTE := FALSE;
                    MCASTO := FALSE;
                    BLIPEN := FALSE;
            ENDWITH;

IF (!DBCLR) THEN STATE8
            WITH    MCASTE := FALSE;
                    MCASTO := FALSE;
                    BLIPEN := FALSE;
            ENDWITH;
State STATE8: "Assert CAS.

"Reset.
    IF (DBCLR) THEN STATE0
            WITH    MCASTE := FALSE;
                    MCASTO := FALSE;
                    BLIPEN := FALSE;
            ENDWITH;

"Read access, assert both even and odd cas.
    IF (!DBCLR & !DBWRRD ) THEN STATEA
            WITH    MCASTE := TRUE;
                    MCASTO := TRUE;
                    BLIPEN := FALSE;
            ENDWITH;

State STATEA: "Even and Odd cas asserted one clock, read access.

"Reset.
    IF (DBCLR) THEN STATE0
            WITH    MCASTE := FALSE;
                    MCASTO := FALSE;
                    BLIPEN := FALSE;
            ENDWITH;

"Blst not asserted, multiple transfer.
    IF (!DBCLR & !DBBLAST ) THEN STATE1
            WITH    MCASTE := TRUE;
                    MCASTO := TRUE;
                    BLIPEN := TRUE;
            ENDWITH;
```

"Blst asserted, single transfer.
IF (!DBCLR & DBBLAST ) THEN STATE0
         WITH   MCASTE := TRUE;
                MCASTO := TRUE;
                BLIPEN := FALSE;
         ENDWITH;

State STATE1: "Read access, first word returned to microprocessor.

"Reset.
    IF (DBCLR) THEN STATE0
            WITH   MCASTE := FALSE;
                   MCASTO := FALSE;
                   BLIPEN := FALSE;
            ENDWITH;

"Even word returned.
    IF (!PBAD02 & !DBCLR ) THEN STATE2
            WITH   MCASTE := TRUE;
                   MCASTO := TRUE;
                   BLIPEN := FALSE;
            ENDWITH;

"Odd word returned.
    IF (PBAD02 & !DBCLR ) THEN STATE2
            WITH   MCASTE := TRUE;
                   MCASTO := TRUE;
                   BLIPEN := FALSE;
            ENDWITH;

State STATE2: "Read access, second word returned to microprocessor.

"Reset.
    IF (DBCLR) THEN STATE0
            WITH   MCASTE := TRUE;
                   MCASTO := TRUE;
                   BLIPEN := FALSE;
            ENDWITH;

"Odd word returned, blst not asserted.
    IF (!PBAD02 & !DBCLR & !DBBLAST) THEN STATE3
            WITH   MCASTE := TRUE;
                   MCASTO := TRUE;
                   BLIPEN := FALSE;
            ENDWITH;

"Even word returned, blst not asserted.
    IF (PBAD02 & !DBCLR & !DBBLAST) THEN STATE3
            WITH   MCASTE := TRUE;
                   MCASTO := TRUE;
                   BLIPEN := FALSE;
            ENDWITH;

"Blst asserted.
    IF (DBBLAST) THEN STATE4
            WITH   MCASTE := TRUE;
                   MCASTO := TRUE;

```
                    BLIPEN := FALSE;
            ENDWITH;

State STATE3: "Read access.

"Reset.
        IF (DBCLR) THEN STATE0
                WITH    MCASTE := TRUE;
                        MCASTO := TRUE;
                        BLIPEN := FALSE;
                ENDWITH;

"Blst unasserted.
        IF (!DBCLR & !DBBLAST ) THEN STATE0
                WITH    MCASTE := TRUE;
                        MCASTO := TRUE;
                        BLIPEN := FALSE;
                ENDWITH;

"Blst asserted, third word returned.
        IF (!DBCLR & DBBLAST ) THEN STATE6
                WITH    MCASTE := TRUE;
                        MCASTO := TRUE;
                        BLIPEN := FALSE;
                ENDWITH;

State STATE4:
        "Reset.
        IF (DBCLR) THEN STATE0
                WITH    MCASTE := FALSE;
                        MCASTO := FALSE;
                        BLIPEN := FALSE;
                ENDWITH;

"No access.
        IF (!DBCLR & !MEMACC) THEN STATE6
                WITH    MCASTE := FALSE;
                        MCASTO := FALSE;
                        BLIPEN := FALSE;
                ENDWITH;

"Access.
        IF (!DBCLR & MEMACC) THEN STATEB
                WITH    MCASTE := FALSE;
                        MCASTO := FALSE;
                        BLIPEN := FALSE;
                ENDWITH;

State STATE6: "Precharge RAS check for access.

"Reset.
        IF (DBCLR) THEN STATE0
                WITH    MCASTE := FALSE;
                        MCASTO := FALSE;
                        BLIPEN := FALSE;
                ENDWITH;

"No access.
```

```
        IF (!DBCLR & !MEMACC) THEN STATE0
                WITH    MCASTE := FALSE;
                        MCASTO := FALSE;
                        BLIPEN := FALSE;
                ENDWITH;

"Access.
        IF (!DBCLR &  MEMACC) THEN STATED
                WITH    MCASTE := FALSE;
                        MCASTO := FALSE;
                        BLIPEN := FALSE;
                ENDWITH;

State STATEB:

"Reset.
        IF (DBCLR) THEN STATE0
                WITH    MCASTE := FALSE;
                        MCASTO := FALSE;
                        BLIPEN := FALSE;
                ENDWITH;

"No access.
        IF (!DBCLR ) THEN STATED
                WITH    MCASTE := FALSE;
                        MCASTO := FALSE;
                        BLIPEN := FALSE;
                ENDWITH;
State STATED: "An access while precharging.

"Reset.
        IF (DBCLR) THEN STATE0
                WITH    MCASTE := FALSE;
                        MCASTO := FALSE;
                        BLIPEN := FALSE;
                ENDWITH;

"Regular access.
        IF (!DBCLR) THEN STATEC
                WITH    MCASTE := FALSE;
                        MCASTO := FALSE;
                        BLIPEN := FALSE;
                ENDWITH;
```

CAS CONTROL PAL CIRCUIT 12-350a3

DEVICE   20R8-7

MODULE XCD09

Pin Specifications:
    (Inputs)

```
REFCLK      PIN     1;  "REFCLK+31
DBCLR       PIN     2;  "DBCLR+00
```

```
DBADS       PIN    3;  "DBADS+10
!DBWRRD     PIN    5;  "DBWRRD-10
!DBBLAST    PIN    6;  "DBBLAST-00
PBAD02      PIN    7;  "PBAD02+10
PBAD31      PIN    8;  "PBAD31-10
PBAD30      PIN    9;  "PBAD30-10
DBMMIO      PIN   10;  "DBMMIO-10
LOGIC0      PIN   13;  "LOGIC0-02

(Outputs)

!DB_RDY     PIN   16;  "DB-RDY-MM
!ROWADD     PIN   17;  "ROWADD-00
!COLADD     PIN   18;  "COLADD-00
Q3,Q2,Q1,Q0 PIN   22,21,20,19; "State bits.

"Equates.

STATE0 = ^HF;
STATE1 = ^H4;
STATE2 = ^HA;
STATE3 = ^H8;
STATE4 = ^HC;
STATE6 = ^HE;
STATE8 = ^HB;
STATEA = ^H9;
STATEB = ^H2;
STATEC = ^H0;
STATED = ^HD;

FALSE = 0;
TRUE  = 1;
MEMACC =  PBAD31 &  PBAD30 & DBADS & !DBMMIO;

QSTATE = [Q3,Q2,Q1,Q0];

"Actual logic equations.

equations state_diagram QSTATE

State STATE0: " Idle, waiting for regular access.

" Reset
        IF (DBCLR) THEN STATE0
            WITH  COLADD  := FALSE;
                  ROWADD  := TRUE ;
                  DB_RDY  := FALSE;
            ENDWITH;

" No access.
        IF (!MEMACC & !DBCLR) THEN STATE0
            WITH  COLADD  := FALSE;
                  ROWADD  := TRUE ;
                  DB_RDY  := FALSE;
            ENDWITH;
```

```
            " Regular access.
            IF (MEMACC & !DBCLR) THEN STATEC
                WITH    COLADD  := FALSE;
                        ROWADD  := TRUE ;
                        DB_RDY  := FALSE;
                ENDWITH;

State STATEC: " Access wait before asserting cas.

" Reset.
            IF (DBCLR) THEN STATE0
                WITH    COLADD  := FALSE;
                        ROWADD  := TRUE ;
                        DB_RDY  := FALSE;
                ENDWITH;
            IF (!DBCLR) THEN STATE8
                WITH    COLADD  := TRUE ;
                        ROWADD  := FALSE;
                        DB_RDY  := FALSE;
                ENDWITH;

State STATE8: " Assert CAS.

" Reset.
            IF (DBCLR) THEN STATE0
                WITH    COLADD  := FALSE;
                        ROWADD  := TRUE ;
                        DB_RDY  := FALSE;
                ENDWITH;

" Read access.
            IF (!DBCLR & !DBWRRD ) THEN STATEA
                WITH    COLADD  := TRUE ;
                        ROWADD  := FALSE;
                        DB_RDY  := FALSE;
                ENDWITH;

State STATEA:

" Reset.
            IF (DBCLR) THEN STATE0
                WITH    COLADD  := FALSE;
                        ROWADD  := TRUE ;
                        DB_RDY  := FALSE;
                ENDWITH;

" Multiple cycle transfer.
            IF (!DBCLR & !DBBLAST ) THEN STATE1
                WITH    COLADD  := TRUE ;
                        ROWADD  := FALSE;
                        DB_RDY  := FALSE;
                ENDWITH;

" Single word transfer.
            IF (!DBCLR & DBBLAST ) THEN STATE0
                WITH    COLADD  := FALSE;
                        ROWADD  := TRUE ;
```

```
            DB_RDY := FALSE;
      ENDWITH;
State STATE1: " Read access, first word returned to
microprocessor.

" Reset.
      IF (DBCLR) THEN STATE0
            WITH  COLADD  := FALSE;
                  ROWADD  := TRUE ;
                  DB_RDY  := FALSE;
            ENDWITH;

" Blast not asserted.
      IF (!DBCLR ) THEN STATE2
            WITH  COLADD  := TRUE ;
                  ROWADD  := FALSE;
                  DB_RDY  := FALSE;
            ENDWITH;

State STATE2: " Read access, second word returned to
microprocessor.

" Reset.
      IF (DBCLR) THEN STATE0
            WITH  COLADD  := FALSE;
                  ROWADD  := TRUE ;
                  DB_RDY  := FALSE;
            ENDWITH;

" Blast not asserted.
      IF (!DBBLAST & !DBCLR) THEN STATE3
            WITH  COLADD  := TRUE;
                  ROWADD  := FALSE;
                  DB_RDY  := FALSE;
            ENDWITH;

" Blast asserted.
      IF (DBBLAST & !DBCLR) THEN STATE4
            WITH  COLADD  := TRUE;
                  ROWADD  := FALSE;
                  DB_RDY  := FALSE;
            ENDWITH;
State STATE3: " Read access.

" Reset.
      IF (DBCLR) THEN STATE0
            WITH  COLADD  := FALSE;
                  ROWADD  := TRUE ;
                  DB_RDY  := FALSE;
            ENDWITH;

" Blast not asserted.
      IF (!DBCLR & !DBBLAST ) THEN STATE0
            WITH  COLADD  := FALSE;
                  ROWADD  := TRUE;
                  DB_RDY  := FALSE;
            ENDWITH;
```

```
            " Blast asserted.
            IF (!DBCLR & DBBLAST ) THEN STATE6
                WITH   COLADD  := FALSE;
                       ROWADD  := TRUE;
                       DB_RDY  := FALSE;
                ENDWITH;

State STATE4:

" Reset.
            IF (DBCLR) THEN STATE0
                WITH   COLADD  := FALSE;
                       ROWADD  := TRUE;
                       DB_RDY  := FALSE;
                ENDWITH;

" No access.
            IF (!DBCLR & !MEMACC) THEN STATE6
                WITH   COLADD  := FALSE;
                       ROWADD  := TRUE;
                       DB_RDY  := FALSE;
                ENDWITH;

" Access.
            IF (!DBCLR &  MEMACC) THEN STATEB
                WITH   COLADD  := FALSE;
                       ROWADD  := TRUE;
                       DB_RDY  := FALSE;
                ENDWITH;
State STATE6:  " Precharge RAS look for access.

" Reset.
            IF (DBCLR) THEN STATE0
                WITH   COLADD  := FALSE;
                       ROWADD  := TRUE;
                       DB_RDY  := FALSE;
                ENDWITH;

" No access.
            IF (!DBCLR & !MEMACC) THEN STATE0
                WITH   COLADD  := FALSE;
                       ROWADD  := TRUE;
                       DB_RDY  := FALSE;
                ENDWITH;

" Access.
            IF (!DBCLR &  MEMACC) THEN STATED
                WITH   COLADD  := FALSE;
                       ROWADD  := TRUE;
                       DB_RDY  := FALSE;
                ENDWITH;

State STATEB:

" Reset.
            IF (DBCLR) THEN STATE0
```

```
            WITH   COLADD  := FALSE;
                   ROWADD  := TRUE;
                   DB_RDY  := FALSE;
            ENDWITH;

IF (!DBCLR ) THEN STATED
            WITH   COLADD  := FALSE;
                   ROWADD  := TRUE;
                   DB_RDY  := FALSE;
            ENDWITH;

State STATED: " Precharge done do the access.

" Reset
    IF (DBCLR) THEN STATE0
            WITH   COLADD  := FALSE;
                   ROWADD  := TRUE;
                   DB_RDY  := FALSE;
            ENDWITH;
    " Regular access.
    IF (!DBCLR) THEN STATEC
            WITH   COLADD  := FALSE;
                   ROWADD  := TRUE;
                   DB_RDY  := FALSE;
            ENDWITH;
```

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A system comprising:
   a clock generator for generating a single frequency clock reference signal for synchronizing operations within said system using predetermined transitions of said reference signal;
   a unit coupled to said clock generator for generating commands for reading and writing memory, one of said commands specifying a burst operation;
   a synchronous bus having address, command and data sections and operating according to a predetermined bus protocol; and,
   a memory tightly coupled to said unit through said synchronous bus, said memory comprising:
   a pair of dynamic random access (DRAM) memories coupled to said bus, each of said DRAMs having an identical width, the sum of the widths being no more than twice as wide as said data section of said bus; and,
   control logic circuit means coupled to said DRAM memories and to said clock generator, said control logic circuit means including:
   first circuit means for generating a column address timing signal in response to selected ones of said predetermined transitions of said clock reference signal which provides an interval which is sufficient in duration to perform a plurality of successive read cycles of operation in said DRAM memories;
   second circuit means for generating a blipper pulse signal in response to two successive transitions other than said predetermined transitions; and,
   logic circuit means coupled to said first and second circuit means for combining said column address timing signal and said blipper pulse signal to produce a column address strobe (CAS) signal to be applied to said DRAM memories during said successive read cycles of operation for reading out a plurality of successive pairs of words for completing the execution of said burst operation without incurring any unit wait states.

2. The system of claim 1 wherein said DRAM memories are organized for storing words having even and odd addresses enabling the read out of a word pair during each memory cycle of operation.

3. The system of claim 1 wherein said predetermined transitions correspond to leading or positive going transitions and said two successive transitions correspond to negative edge or negative going transitions.

4. The system of claim 1 wherein said first circuit means includes a first programmable array logic (PAL) circuit coupled to said clock generator for receiving said clock reference signal, said first PAL circuit being programmed to generate a sequence of state signals in response to said clock reference signal for defining said duration of said column address timing signal.

5. The system of claim 1 wherein said second circuit means includes a second PAL circuit coupled to said clock generator circuit to receive said clock reference signal, said second PAL circuit being programmed to generate a sequence of state signals in response to said clock reference signals for defining said duration of said blipper pulse signal.

6. The system of claim 5 wherein said duration of said blipper pulse signal corresponds to the time required for precharging said DRAM memories for performing successive read cycles of operation.

7. The system of claim 1 wherein said logic circuit means includes a number of gate circuits, each gate circuit logically combining said column address timing signal and said blipper pulse signal to produce said CAS signal.

8. The system of claim 7 wherein said number is two and said each gate is a NAND gate.

9. The system of claim 1 wherein each of said DRAM memories is constructed from a plurality of DRAM chips designed to operate in a high speed access or page mode.

10. The system of claim 1 wherein said one of said commands specifying said burst operation requires two successive transfers of sets of words on said bus.

11. The system of claim 1 wherein said plurality of successive read cycles is two and said successive numbers of pairs of words is two.

12. The system of claim 9 wherein each DRAM memory has a width corresponding to the width of said data section of said bus.

* * * * *